June 23, 1931.  W. I. HANSON ET AL  1,811,269
STEERING WHEEL
Filed April 13, 1929
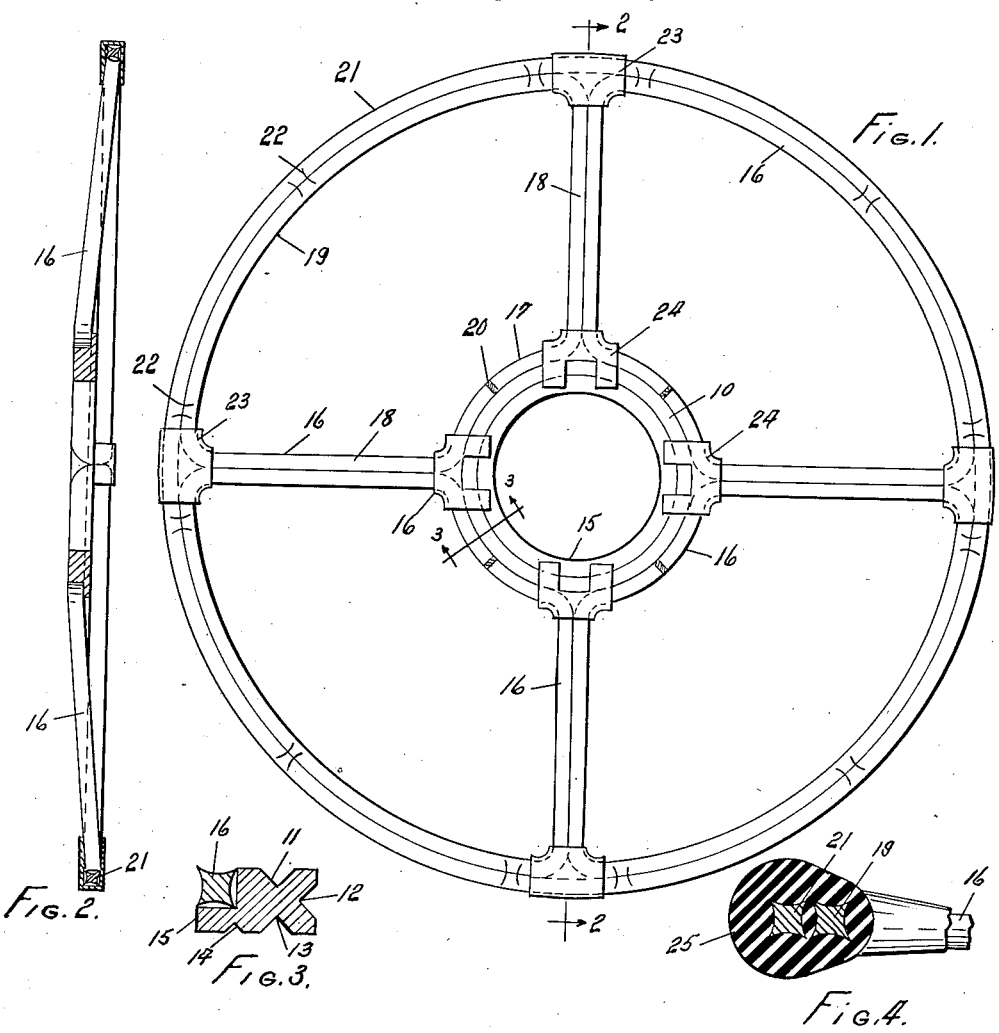
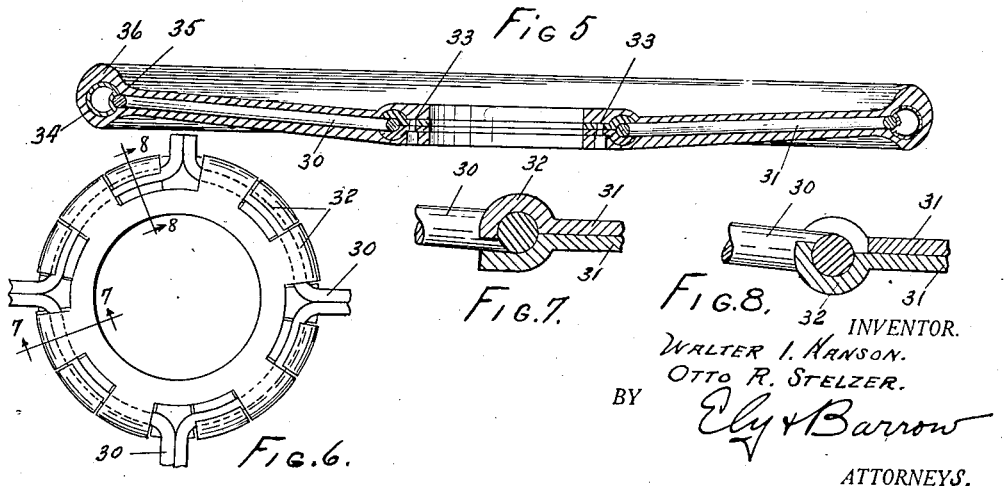
INVENTOR.
WALTER I. HANSON.
OTTO R. STELZER.
BY Ely & Barrow
ATTORNEYS.

Patented June 23, 1931

1,811,269

UNITED STATES PATENT OFFICE

WALTER I. HANSON AND OTTO R. STELZER, OF AKRON, OHIO, ASSIGNORS TO FIRESTONE STEEL PRODUCTS COMPANY, OF AKRON, OHIO, A CORPORATION OF OHIO

STEERING WHEEL

Application filed April 13, 1929. Serial No. 354,780.

This invention relates to steering wheels for automobiles or other vehicles.

The general purpose of the invention is to provide a simple inexpensive but effective steering wheel construction including a metal sub-structure and a covering of molded plastic material such as hard rubber, artificial resins or the like.

The foregoing and other purposes of the invention are attained in the steering wheel constructions illustrated in the accompanying drawings and described below. It is to be understood that the invention is not limited to the specific forms thereof shown and described.

Of the accompanying drawings,

Figure 1 is a plan of a steering wheel sub-structure embodying the invention;

Figure 2 is a section on line 2—2 of Figure 1;

Figure 3 is a section on line 3—3 of Figure 1;

Figure 4 is a part radial section through the rim of a completed wheel comprising the sub-structure illustrated in Figures 1 to 3;

Figure 5 is a diametrical section through another form of complete steering wheel embodying the invention;

Figure 6 is a plan of the hub portion of the sub-structure for said wheel;

Figure 7 is a section on line 7—7 of Figure 6; and

Figure 8 is a section on line 8—8 of Figure 6.

Referring to Figures 1 to 4 of the drawings, the numeral 10 designates an annular metal hub member formed with circumferential grooves or other indentations as at 11, 12, 13 and 14 and with a ledge 15 at its outer edge upon which the spider of wheel is supported.

The spider of the wheel includes a number of similar segments 16, 16 made of wire or the like and adapted to be fitted about the hub 10 and each including inner arcuate portions 17, radial sides 18, 18 and outer arcuate portions 19. These may each be made of a single strand of wire bent to the segmental shape shown with the ends preferably abutting and welded together in the inner arcuate portions 18 as indicated at 20. The inner arcuate portions 17 of the segments 16 accordingly constitute hub structure and the outer arcuate portions 19 thereof constitute rim structure in the completed wheel, the adjacent radial portions 18 of the segments constituting the spoke or spider arms of the wheel.

The rim of the sub-structure preferably includes an annulus 21 of wire similar to that used in the spider segments which is placed about the segments and may be welded to the outer arcuate portions 19 thereof as indicated at 22, 22.

To effectively secure the various parts of the sub-structure together, clips 23, 23 and 24, 24 are provided at the inner and outer ends of the spokes respectively, to embrace adjoining segments 16 and the hub member 10, and to embrace the adjoining segments 16 and the annulus 21.

The wire employed in the sub-structure preferably is of a section similar to that shown in Figures 2, 3 and 4, that is, square with hollowed out or indented sides and the hub 10 is indented as indicated at 11, 12, 13 and 14 so that the rubber or other plastic material 25 molded about the sub-structure to complete the wheel as shown in Figure 4 will be effectively interlocked with the sub-structure when molded and vulcanized, cured, or otherwise applied to the sub-structure.

In Figures 5 to 8 a modified form of wheel is shown including segmental members 30 of wire similar to members 16 which have their inner arcuate portions clamped between a pair of hub plates 31, 31 having radial clip portions 32, 32 embracing the inner arcuate portions of the segments alternately from opposite plates about the hub as shown in Figures 6, 7 and 8, the clips from one plate fitting between the clips from the opposite plate, the hub plates being secured together by rivets at 33, 33. A hollow or tubular annulus 34 is shown about the segments 30 to complete the sub-structure of the wheel, a circumferential depression on the inner periphery of the annulus 34 having the outer arcuate portions of segments 30 fitted therein as shown at 35. The hard rubber or other covering is shown molded about this wheel at 36.

It will be apparent from the foregoing that a simple, economically constructed steering wheel has been provided by the invention. Obviously, modifications thereof may be resorted to without departing from the spirit thereof or the scope of the appended claims.

What is claimed is:

1. A steering wheel comprising a sub-structure including a metal hub member, a series of endless segmental members of wire provided with inner arcuate portions fitting about and secured to the hub member, radial portions positioned adjacent each other in adjoining segments to provide spokes and outer arcuate portions at the rim of the wheel, an endless wire rim member fitted about and secured to the outer arcuate portions of said segmental members, there being clips at the inner and outer ends of the spoke portions for securing the segments to the hub member and to the rim member respectively, and a molded covering over said sub-structure.

2. A steering wheel comprising a sub-structure including a metal hub member, a series of endless segmental members of wire provided with inner arcuate portions fitting about and secured to the hub member, radial portions positioned adjacent each other in adjoining segments to provide spokes and outer arcuate portions at the rim of the wheel, an endless rim member fitted about and secured to the outer arcuate portions of said segmental members, and a molded covering over said sub-structure.

3. A steering wheel comprising a sub-structure including a metal hub member, a series of segmental members provided with inner arcuate portions fitting about and secured to the hub member, radial portions positioned adjacent each other in adjoining segments to provide spokes and outer arcuate portions at the rim of the wheel, an endless rim member fitted about and secured to the outer arcuate portions of said segmental members, there being clips at the inner and outer ends of the spoke portions for securing the segments to the hub member and to the rim member respectively, and a molded covering over said sub-structure.

4. A steering wheel comprising a sub-structure including a metal hub member, a series of segmental members provided with inner arcuate portions fitting about and secured to the hub member, radial portions positioned adjacent each other in adjoining segments to provide spokes and outer arcuate portions at the rim of the wheel, an endless rim member fitted about and secured to the outer arcuate portions of said segmental members, and a molded covering over said sub-structure.

In witness whereof, we have hereunto affixed our signatures this 9th day of April, 1929.

WALTER I. HANSON.
OTTO R. STELZER.